United States Patent [19]

Suzuki

[11] Patent Number: 4,626,085

[45] Date of Patent: Dec. 2, 1986

[54] ROTATABLE DOOR MIRROR FOR A MOTOR VEHICLE

[75] Inventor: Masaru Suzuki, Chiryu, Japan

[73] Assignee: Kabushiki Kaisha Tokai Rika Denki Seisakusho, Aichi, Japan

[21] Appl. No.: 795,458

[22] Filed: Nov. 6, 1985

[30] Foreign Application Priority Data

Nov. 6, 1984 [JP] Japan ............................ 59-168843[U]

[51] Int. Cl.[4] ............................................. G02B 7/18
[52] U.S. Cl. ................................................... 350/604
[58] Field of Search ............... 350/604, 605, 606, 632, 350/633, 637; 248/480

[56] References Cited

U.S. PATENT DOCUMENTS

| | | | |
|---|---|---|---|
| 3,937,563 | 2/1976 | Frabe | 248/480 X |
| 4,158,483 | 6/1979 | Fisher et al. | 350/633 X |
| 4,380,370 | 4/1983 | Mittelhauser | 248/475.1 X |
| 4,464,017 | 8/1984 | Wada | 350/604 |
| 4,504,116 | 3/1985 | Sharp | 350/637 |
| 4,558,930 | 12/1985 | Deedreek | 350/604 |

Primary Examiner—Donald Watkins
Attorney, Agent, or Firm—Birch, Stewart, Kolasch & Birch

[57] ABSTRACT

An apparatus for retractably tilting a visor of a door mirror of a motor vehicle between a normal position and a retracted position, including a spring member made of shape-memory alloy, a lever member for setting the spring member at a minimum mounting length and a maximum mounting length when the visor is disposed at one of and the other one of the normal position and the retracted position, respectively, and a battery acting as a power source of the apparatus, whereby when the spring member is heated upon its energization, the spring member is contracted from the maximum mounting length to the minimum mounting length based on shape-memory effect of the shape-memory alloy such that the visor is tilted to one of the normal position and the retracted position.

7 Claims, 6 Drawing Figures

ROTATABLE DOOR MIRROR FOR A MOTOR VEHICLE

BACKGROUND OF THE INVENTION

The present invention generally relates to a motor vehicle and more particularly, to an apparatus for retractably tilting a visor of each of a pair of door mirrors of the motor vehicle between a normal position and a retracted position of the visor through remote handling of the apparatus from a passenger compartment of a motor vehicle.

The door mirrors of a motor vehicle, for viewing behind the motor vehicle, are each mounted on each of a pair of outer door panels of the motor vehicle so as to project outwardly in a sidewise direction from the motor vehicle to a large extent. Therefore, in the case where a driver parks the motor vehicle in a narrow space, the driver's attention is focused on the forward direction of the motor vehicle, so that such an accident may frequently happen that the door mirrors are bumped against sidewise obstacles such as pillars or the like. In order to obviate such inconvenience, there have been proposed various tiltable door mirrors in which the visor is pivoted in the forward and rearward directions of the motor vehicle so as to be retained at the retracted position where the visor extends along the outer door panel of the motor vehicle. In known electrically-operated apparatuses for retractably tilting the visor through remote manipulation from the passenger compartment of the motor vehicle, a motor or a solenoid plunger is employed, thereby resulting in a sharp rise of production costs of the known apparatuses. Furthermore, the known apparatuses are disadvantageous in that since the motor or the solenoid plunger has a large actuation speed, it is necessary to employ a large reduction ratio, thus resulting in complicated constructions of the known apparatuses.

SUMMARY OF THE INVENTION

Accordingly, an essential object of the present invention is to provide an apparatus for retractably tilting a visor of each of a pair of door mirrors of a motor vehicle between a normal position and a retracted position of the visor. A coiled spring made of shape-memory alloy is employed such that the visor can be tilted to the retracted position or the normal position through utilization of such shape-memory effect that the coiled spring made of shape-memory alloy returns to its original shape when heated by energizing the coiled spring, with substantial elimination of the disadvantages inherent in conventional apparatuses of this kind.

Another important object of the present invention is to provide an apparatus of the above-described type which not only can be produced at low cost but is simple in structure through elimination of the need for provision of a motor or the like.

In order to accomplish these objects of the present invention, there is provided an apparatus for retractably tilting a visor of a door mirror of a motor vehicle. The door mirror includes a stay attached to an outer door panel of the motor vehicle and formed with a rotary shaft portion and a mirror member mounted on said visor. The visor is formed with a hole and is pivotally mounted on said stay through fitting of said rotary shaft portion of said stay into said hole of said visor so as to be pivoted about said rotary shaft portion in forward and rearward directions of said motor vehicle between a normal position where said visor is projected sidewise outwardly from said outer door panel of said motor vehicle and a retracted position where said visor is retracted towards said outer door panel. The apparatus includes two springs which are made of shape-memory alloy and a lever for setting one spring at a minimum mounting length and the other at a maximum mounting length when said visor is disposed at the normal position and vice versa when said visor is disposed at the retracted position. The springs are mounted between the lever, positioned on the rotary shaft portion, and an attachment point on the inner portion of said visor. A battery is utilized as a power source for the apparatus, which is electrically connected to the opposite ends of each spring, whereby when a spring is heated upon energization thereof, the spring is contracts from the maximum mounting length to the minimum mounting length based on the shape-memory effect of the shape-memory alloy such that said visor is tilted to either the normal position or the retracted position.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Before the description of the present invention proceeds, it is to be noted that like parts are designated by like reference numerals throughout several views of the accompanying drawings.

DETAILED DESCRIPTION OF THE INVENTION

Figure 1:
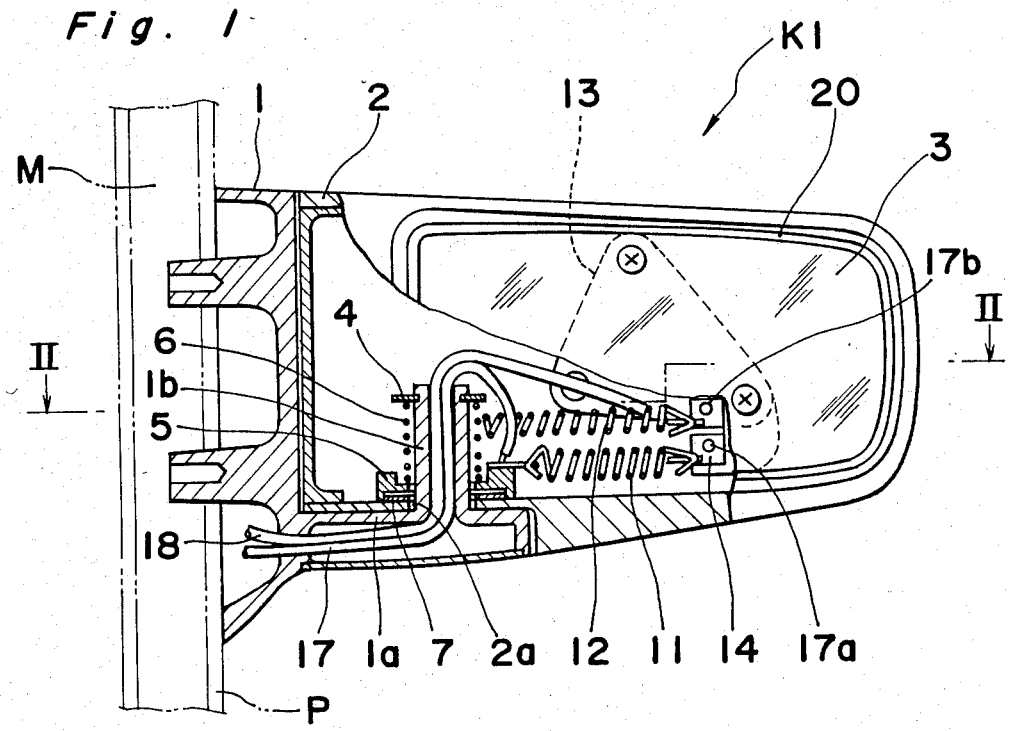
FIG. 1 is a partially cutaway front elevational view of an apparatus according to a first embodiment of the present invention.

Referring now to the drawings, there is shown in FIGS. 1 to 5, an apparatus K1 according to a first embodiment of the present invention for retractably tilting a visor 2 of each of a pair of door mirrors of a motor vehicle M between a normal position and a retracted position of the visor 2 through remote handling of the apparatus K1 from a passenger compartment of the motor vehicle M. The door mirror generally includes a stay 1 attached to each of a pair of outer door panels P of the motor vehicle M. The visor 2 is pivotally mounted on the stay 1 and a mirror member 3 is supported in the visor 2.

Figure 4:
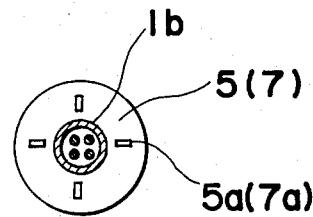
FIG. 4 is a schematic view of a detent portion of the apparatus of FIG. 1.

In the apparatus K1, the stay 1 is formed, at its lower end, with an arm portion 1a extending horizontally and outwardly in a sidewise direction from the motor vehicle and has a cylindrical rotary shaft portion 1b formed on the upper face of the arm portion 1a. Meanwhile, the visor 2 is formed with a hole 2a extending through a bottom wall of the visor 2. The rotary shaft portion 1b of the stay 1 is fitted into the hole 2a of the visor 2 so as to project into the visor 2 such that the visor 2 can be pivoted about the rotary shaft portion 1b in the forward and rearward directions of the motor vehicle M. A retainer ring 4 is attached to a distal end portion of the rotary shaft portion 1b projecting into the visor 2. A support member 5 is fixedly fitted around a lower portion of the rotary shaft portion 1b. A compression spring 6 is wound, between the retainer ring 4 and the support member 5, around the rotary shaft portion 1b so as to urge the support member 5 downwardly. A detent plate 7 is secured to the upper face of the bottom wall of the visor 2 such that the lower face of the support member 5 is brought into pressing contact with the detent plate 7. Four detent recesses 7a and four detent projections 5a engageable with the detent recesses 7a, are respectively provided on the contact surfaces of the detent plate 7 and the support plate 5 so as to be circumferentially uniformly spaced at intervals of 90° as shown in FIG. 4. Thus, when the visor 2 has been tilted to the normal position where the visor 2 projects outwardly at right angles to each of the outer door panels P in the sidewise direction of the motor vehicle M as shown by the solid lines in FIG. 2 and when the visor 2 has been tilted to the retracted position where the visor 2 extends along each of the outer door panels P as shown by the imaginary lines in FIG. 2, the detent recesses 7a and the detent projections 5a are brought into engagement with each other so as to lightly retain the visor 2 at either the normal position or the retracted position.

Figure 2:
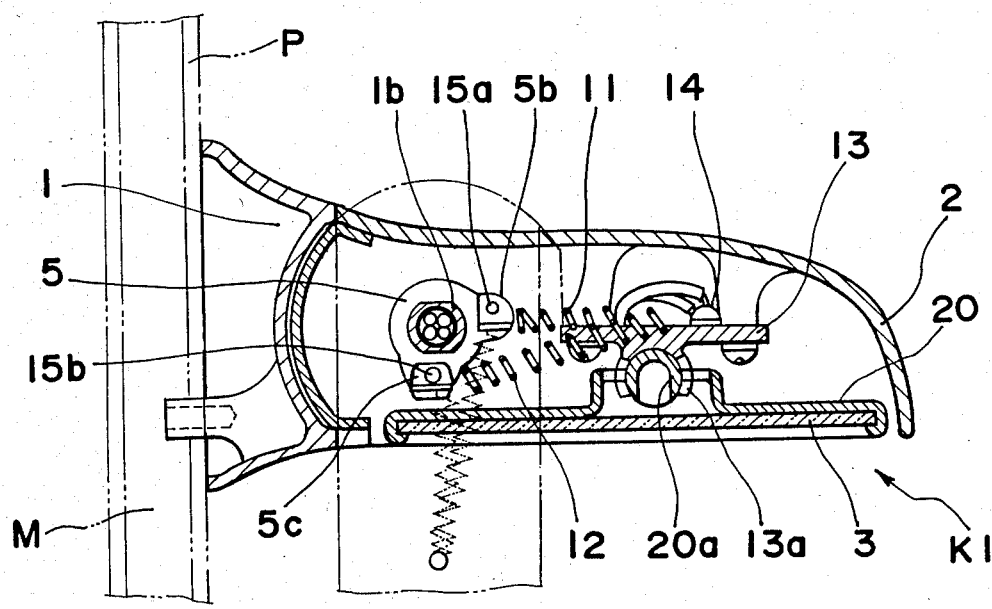
FIG. 2 is a cross-sectional view taken along the line II—II in FIG. 1.

As shown in FIG. 2, the support member 5 is formed with a first retainer portion 5b projecting radially outwardly in the sidewise direction of the motor vehicle M and a second retainer portion 5c projecting radially and substantially at right angles to the first retainer portion 5b in the rearward direction of the motor vehicle M so as to act as a lever member. A coiled spring 11 for tilting the visor 2 from the retracted position to the normal position is attached, at one end thereof, to the first retainer portion 5b, while a coiled spring 12 for tilting the visor 2 from the normal position to the retracted position is attached, at one end thereof, to the second retainer portion 5c. A spring retainer 14 is fixed to a mirror supporting member 13 provided securely in the visor 2 such that each of the coiled springs 11 and 12 is attached, at the other end thereof, to the spring retainer 14. Thus, the coiled springs 11 and 12 are extended between the visor 2 and the outer peripheral portions 5b and 5c of the rotary shaft portion 1b, respectively.

As shown in FIG. 2, spring supporting points of the spring retainer 14 are set at a point on a straight line extending, through the axis of the rotary shaft portion 1b. Accordingly, when the visor 2 is disposed at the normal position and the retracted position, the coiled spring 11 has a minimum mounting length and a maximum mounting length, respectively. Meanwhile, when the visor 2 is disposed at the normal position and the retracted position, the coiled spring 12 has a maximum mounting length and a minimum mounting length, respectively.

The coiled springs 11 and 12 are made of shape-memory alloy and are arranged to be contracted to their original shapes when heated to a predetermined temperature by energizing the coiled springs 11 and 12. Thus, when the visor 2 is rotated from the normal position to the retracted position, the coiled spring 12 is heated upon energization thereof so as to be contracted and thus, the visor 2 is pivoted to the retracted position by the contraction force of the coiled spring 12 in the rearward direction of the motor vehicle M, i.e. in the downward direction in FIG. 2 as shown by the imaginary lines in FIG. 2. Meanwhile, in the case where the coiled spring 11 is heated upon energization thereof so as to be contracted when the visor 2 is disposed at the retracted position, the visor 2 is pivoted by the contraction force of the coiled spring 11 in the forward direction of the motor vehicle M, i.e. in the upward direction in FIG. 2 so as to be returned to the normal position as shown by the solid lines in FIG. 2.

Figure 3:
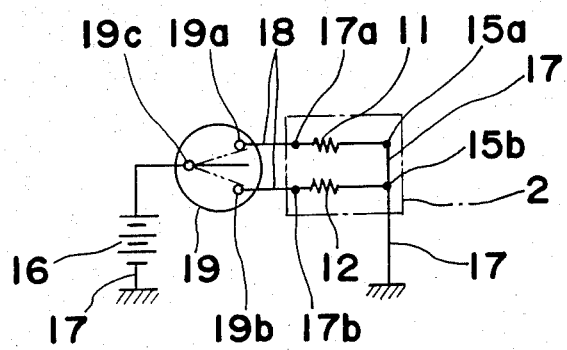
FIG. 3 is an electrical circuit diagram of the apparatus of FIG. 1.

As shown in FIG. 2, spring terminals 15a and 15b are, respectively, attached to the first and second retainer portions 5b and 5c so as to be coupled with one end of the coiled spring 11 and one end of the coiled spring 12, respectively. The apparatus K1 further includes a battery 16 acting as a power source for the apparatus K1 as shown in FIG. 3. The spring terminals 15a and 15b are connected to the negative terminal of the battery 16 by way of a cord 17 extending through the arm portion 1a and the rotary shaft portion 1b of the stay 1. Meanwhile, the other end of the coiled spring 11 and the other end of the coiled spring 12 are, respectively, connected to spring terminals 17a and 17b attached to the spring retainer 14. The spring terminals 17a and 17b are, respectively, connected, via cord 18, to output terminals 19a and 19b of a switch 19 for rotating the visor 2 to either the normal position or the retracted position. The switch 19 is disposed peripherally of the driver's seat (not shown) of the motor vehicle M. A switching contact 19c of the switch 19, which is selectively changed over to the output terminals 19a and 19b, is connected to the positive terminal of the battery 16.

A mirror supporting member 13 is formed with a spherical bearing portion 13a. A mirror holder 20 for holding the mirror member 3 has a spherical portion 20a. The spherical portion 20a is tiltably fitted into the spherical bearing portion 13a such that the mirror member 3 is adjustably tilted both in the horizontal direction of the motor vehicle M and in the vertical direction of the motor vehicle M.

Figure 5:
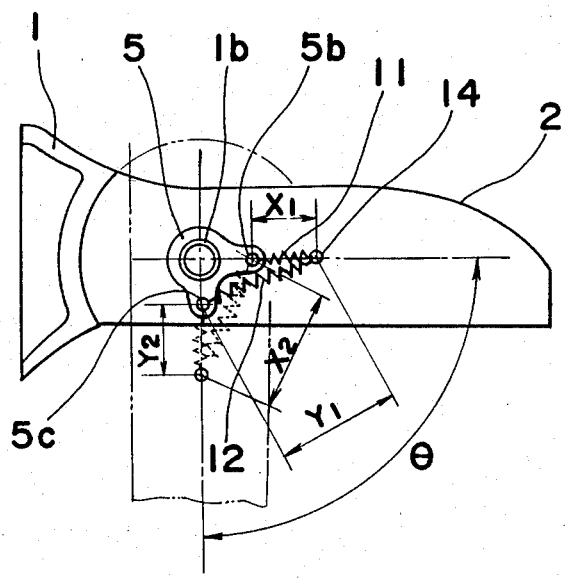
FIG. 5 is a view explanatory of an operating principle of the apparatus of FIG. 1.

Operation of the apparatus K1 of the above described arrangement will be described with reference to FIG. 5, hereinbelow. When the visor 2 is disposed at the normal position where the visor 2 projects outwardly in the sidewise direction of the motor vehicle M as shown by the solid lines in FIG. 5, the coiled spring 11 has a minimum length X1 and the coiled spring 12 has a maximum length Y1. In the case where the visor 2 is tilted from the normal position to the retracted position, the switching contact 19c is connected to the output terminal 19b by actuating the switch 19, so that the coiled spring 12 is heated through energization thereof. When the coiled spring 12 has been heated to the predetermined temperature, the coiled spring 12 contracts from the maximum length Y1 so as to return to its original shape. The contraction force of the coiled spring 12 pivots the visor 2 about the rotary shaft portion 1b of the stay 1 in the clockwise direction in FIG. 5 so as to expand the coiled spring 11 as shown by the imaginary lines in FIG. 5 such that the visor 2 is tilted to the retracted position in the rearward direction of the motor vehicle M. When the visor 2 is disposed at the retracted position, the coiled spring 11 has a maximum length X2 and the coiled spring 12 has a minimum length Y2.

Meanwhile, in the case where the visor 2 is returned from the retracted position to the normal position, the switching contact 19c is connected to the output terminal 19a by actuating the switch 19, so that the coiled spring 11 is heated through energization thereof. When the coiled spring 11 has been heated to the predetermined temperature, the coiled spring 11 contracts from the maximum length X2 so as to return to its original length. The contraction force of the coiled spring 11 pivots the visor 2 about the rotary shaft portion 1b in the counterclockwise direction in FIG. 5 so as to expand the coiled spring 12 to the maximum length Y1 such that the visor 2 is returned to the normal position. When the visor 2 is disposed at the normal position and the retracted position, the detent projections 5a of the support plate 5 are, respectively, brought into engagement with the detent recesses 7a of the detent plate 7 secured to the visor 2 such that the visor 2 is lightly retained at the normal position and the retracted position.

Figure 6:
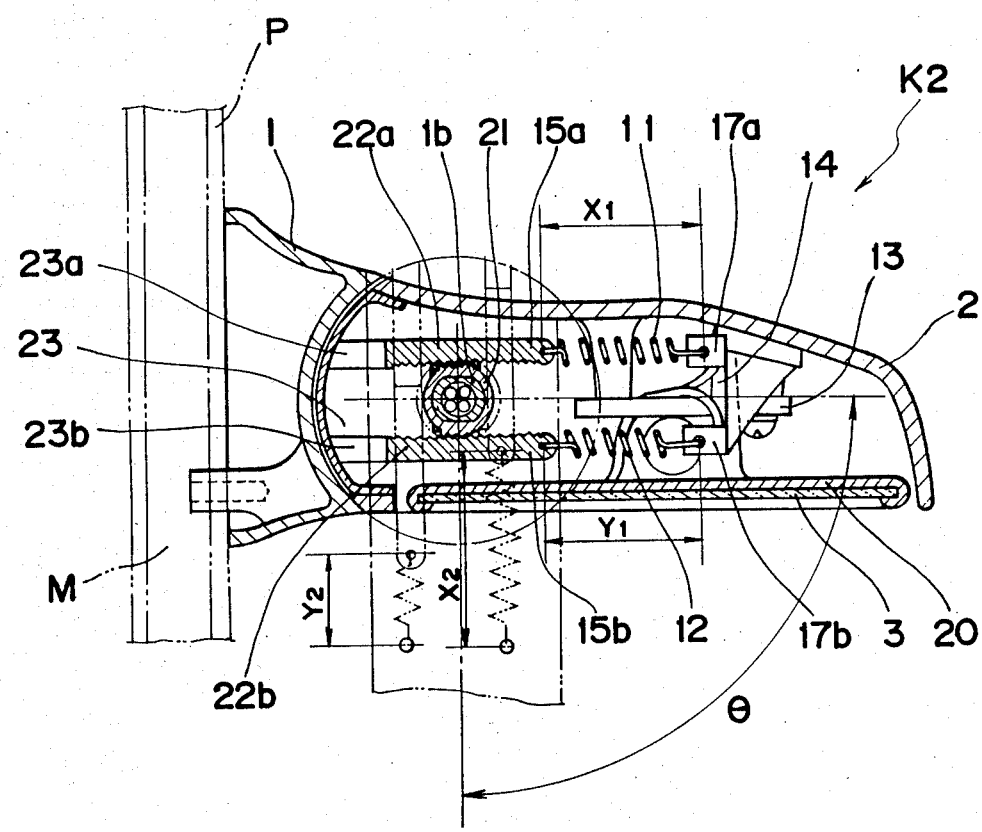
FIG. 6 is a view similar to FIG. 2, particularly showing a second embodiment of the present invention.

Referring further to FIG. 6, there is shown an apparatus K2 according to a second embodiment of the present invention. The apparatus K2 includes a pinion 21, a pair of racks 22a and 22b in mesh with the pinion 21, and a support member 23 for supporting the racks 22a and 22b. The pinion 21 is mounted on the rotary shaft portion 1b. The racks 22a and 22b are, respectively, provided forwardly of and rearwardly of the pinion 21 so as to extend, in parallel with each other, outwardly in the sidewise direction of the motor vehicle M such that the pinion 21 is interposed between the racks 22a and 22b. The racks 22a and 22b are held in engagement with the pinion 21 so as to be displaced in the rightward and leftward directions in FIG. 6. The support member 23 is secured to the visor 2 and is formed with a pair of guide grooves 23a and 23b. The racks 22a and 22b are, respectively, slidably fitted into the guide grooves 23a and 23b so as to be supported by the support member 23. The sidewise outer end of the rack 22a is coupled with one end of the coiled spring 11, while the sidewise outer end of the rack 22b is coupled with one end of the coiled spring 12. The other end of the coiled spring 11 and the other end of the coiled spring 12 are attached to the lower and upper portions of the spring retainer 14 secured to the visor 2 in the same manner as in the apparatus K1. It should be noted that other constructions of the apparatus K2 are similar to those of the apparatus K1.

In the apparatus K2 of the above described arrangement, when the visor 2 is disposed at the normal position as shown by the solid lines in FIG. 6, the coiled spring 11 has a minimum length X1 and the coiled spring 12 has a maximum length Y1. When the coiled spring 12 is heated through energization thereof in order to rotate the visor 2 from the normal position to its retracted position, the coiled spring 12 contracts to the original shape. Since the spring retainer 14 having the coiled spring 12 attached thereto is pulled in the leftward direction in FIG. 6 by the contracted coiled spring 12, a rotary force oriented in the clockwise direction in FIG. 6 is imparted to the visor 2. Thus, the visor 2 is pivoted in the clockwise direction towards the retracted position such that the coiled spring 11 is expanded. When the visor 2 has been pivoted in the clockwise direction to the retracted position, the racks 22a and 22b coupled with the coiled springs 11 and 12, respectively are displaced to the positions shown by the imaginary lines in FIG. 6 in mesh with the pinion 21. When the visor 2 is disposed at the retracted position, the coiled spring 11 has a maximum length X2 and the coiled spring 12 has a minimum length Y2. In the case where the visor 2 is returned from the retracted position to the normal position, the coiled spring 11 is heated through energization thereof. Thus, the coiled spring 11 contracts to the original shape so as to impart to the visor 2 a rotary force oriented in the counterclockwise direction in FIG. 6. Accordingly, the visor 2 is pivoted in the counterclockwise direction towards the normal position such that the coiled spring 11 is expanded. When the visor 2 is disposed at the normal position and the retracted position, the visor 2 is lightly restrained from movement at the normal position and the retracted position through engagement of the detent projections 5a of the support plate 5 with the detent recesses 7a of the detent plate 7.

As is clear from the foregoing description, in the apparatus of the present invention, the coiled spring made of shape-memory alloy is employed and a rotary force is imparted to the visor based on such shape-memory effect of the shape-memory alloy that the coiled spring made of the shape-memory alloy returns to the original shape when heated by energizing the coiled spring.

Accordingly, in accordance with the present invention, it becomes possible to rotate the visor from the normal position to the retracted position or return the visor from the retracted position to the normal position with ease.

Thus, in accordance with the present invention, since a motor is not required to be provided in the apparatus for retractably tilting the visor through electrical remote handling of the apparatus from the passenger compartment of the motor vehicle, production cost of the apparatus can be reduced drastically and the apparatus is remarkably simplified in structure.

Furthermore, in accordance with the present invention, since structural restrictions of the apparatus are lessened through elimination of the need for provision of the motor, the apparatus can be decreased in thickness.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for retractably tilting a visor of a door mirror of a motor vehicle, said door mirror including a stay attached to an outer door panel of said motor vehicle and formed with a rotary shaft portion and a mirror member mounted on said visor, with said visor being formed with a hole and being pivotally mounted on said stay through fitting of said rotary shaft portion of said stay into said hole of said visor so as to be pivoted about said rotary shaft portion in forward and rearward directions of said motor vehicle between a normal position where said visor is projected outwardly from said outer door panel in a sidewise direction of said motor vehicle and a retracted position where said visor is retracted towards said outer door panel, said apparatus comprising:
- a spring means having a first and second element which are made of shape-memory alloy;
- a lever means for supporting said first element of said spring means at a minimum mounting length when said visor is disposed at the normal position and at a maximum mounting length when said visor is disposed at the retracted position and supporting said second element of said spring means at a maximum mounting length when said visor is disposed at the normal position and at a minimum mounting length when said visor is disposed at the retracted position, said lever means is provided peripherally outwardly from said rotary shaft portion;
- said spring means being attached, at opposite ends thereof, to said lever means and an inner portion of said visor; and
- a battery acting as a power source of said apparatus, which is connected to the opposite ends of said spring means, whereby when said spring means is heated upon energization thereof, said spring means is contracted from the maximum mounting length to the minimum mounting length based on shape-memory effect of the shape-memory alloy such that said visor is rotated between the normal and retracted positions.

2. An apparatus as claimed in claim 1, further comprising:
- a detent device for lightly retaining said visor at the normal position and the retracted position, which is provided between said rotary shaft portion and said visor;
- said spring means including a first coiled spring for rotating said visor from the retracted position to the normal position and a second coiled spring for rotating said visor from the normal position to the retracted position;
- said first coiled spring assuming the minimum mounting length and the maximum mounting length when said visor is disposed at the normal position and the retracted position, respectively;
- said second coiled spring assuming the maximum mounting length and the minimum mounting length when said visor is disposed at the normal position and the retracted position; respectively;
- said lever means including a lever member secured to said rotary shaft portion;
- said lever member being formed with a first retainer portion extending outwardly in the sidewise direction of said motor vehicle from an axis of said rotary shaft portion and a second retainer portion extending in the rearward direction of said motor vehicle from the axis of said rotary shaft portion;
- said inner portion of said visor being disposed at a point on a straight line extending, through said first retainer portion, from the axis of said rotary shaft portion;
- said first coiled spring being attached, at one of the opposite ends, to said first retainer portion and being attached, at the other one of the opposite ends, to said inner portion of said visor;
- said second coiled spring being attached, at one of the opposite ends, to said second retainer portion and being attached, at the other one of the opposite ends, to said inner portion of said visor.

3. An apparatus as claimed in claim 1, further comprising:
- a detent device for lightly retaining said visor at the normal position and the retracted position, which is provided between said rotary shaft portion and said visor;
- said spring means including a first coiled spring for tilting said visor from the retracted position to the normal position and a second coiled spring for tilting said visor from the normal position to the retracted position;
- said first coiled spring assuming the minimum mounting length and the maximum mounting length when said visor is disposed at the normal position and the retracted position, respectively;
- said second coiled spring assuming the maximum mounting length and the minimum mounting length when said visor is disposed at the normal position and the retracted position, respectively;
- said lever means including a pinion mounted on said rotary shaft portion and first and second racks in mesh with said pinion;
- said first and second racks being slidably supported so as to extend in parallel with each other in the sidewise direction of said motor vehicle such that said pinion is interposed between said first and second racks;
- said first coiled spring being attached, at one of the opposite ends, to one end of said first rack and being attached, at the other one of the opposite ends, to said inner portion of said visor;
- said second coiled spring being attached, at one of the opposite ends, to one end of said second rack and being attached, at the other one of the opposite ends, to said inner portion of said visor.

4. An apparatus as claimed in claim 2, further comprising:
- a switch for selectively supplying electric power to said first and second coiled springs, which is provided with a first output terminal for said first coiled spring, a second output terminal for said second coiled spring and a switching contact changed over selectively to said first output terminal and said second output terminal;
- the one of the opposite ends of said first coiled spring and the one of the opposite ends of said second coiled spring being connected to a negative terminal of said battery;
- the other one of the opposite ends of said first coiled spring and the other one of the opposite ends of said second coiled spring being connected to said first and second output terminals, respectively;
- said switching contact being connected to a positive terminal of said battery.

5. An apparatus as claimed in claim 3, further comprising:
- a switch for selectively supplying electric power to said first and second coiled springs, which is provided with a first output terminal for said first coiled spring, a second output terminal for said second coiled spring and a switching contact changed over selectively to said first output terminal and said second output terminal;
- the one of the opposite ends of said first coiled spring and the one of the opposite ends of said second coiled spring being connected to a negative terminal of said battery;

the other one of the opposite ends of said first coiled spring and the other one of the opposite ends of said second coiled spring being connected to said first and second output terminals, respectively;

said switching contact being connected to a positive terminal of said battery.

6. A rotatable mirror for a motor vehicle comprising:
a mirror;
stay means having a rotary shaft portion for rotatably supporting the rotatable mirror, said stay means is attached to a portion of the motor vehicle;
visor means rotatably supported by said rotary shaft portion of said stay means, said mirror is supported by said visor means, said visor is rotatable between a normal position wherein said visor is projected outwardly from said motor vehicle in a sidewise direction to a retracted position wherein said visor is rotated towards the motor vehicle;
lever means operatively connected to said rotary shaft portion of said stay means;
spring means operatively connected between said lever means and said visor, said spring means is made of shape-memory alloy for enabling said spring means to contract upon energization for producing a tension force between said lever means and said visor for rotating the rotatable mirror between said normal and retracted positions.

7. The rotatable mirror according to claim 6, wherein said spring means comprises a first spring means for rotating said mirror from said normal position to said retracted position and a second spring means for rotating said mirror from said retracted position to said normal position.

* * * * *